US012102570B2

(12) United States Patent
Siccardi et al.

(10) Patent No.: US 12,102,570 B2
(45) Date of Patent: Oct. 1, 2024

(54) POSITIONING APPARATUS OF A PATIENT'S LIMB

(71) Applicant: MEDACTA INTERNATIONAL SA, Castel San Pietro (CH)

(72) Inventors: Francesco Siccardi, Castel San Pietro (CH); Massimiliano Bernardoni, Castel San Pietro (CH); Ermete Rossi, Castel San Pietro (CH); Frederic Laude, Castel San Pietro (CH); Paolo Righettini, Castel San Pietro (CH)

(73) Assignee: MEDACTA INTERNATIONAL SA, Castel San Pietro (CH)

( * ) Notice: Subject to any disclaimer, the term of this patent is extended or adjusted under 35 U.S.C. 154(b) by 927 days.

(21) Appl. No.: 17/055,652

(22) PCT Filed: Apr. 24, 2019

(86) PCT No.: PCT/IB2019/053363
§ 371 (c)(1),
(2) Date: Nov. 16, 2020

(87) PCT Pub. No.: WO2019/220239
PCT Pub. Date: Nov. 21, 2019

(65) Prior Publication Data

US 2021/0251837 A1 Aug. 19, 2021

(30) Foreign Application Priority Data

May 16, 2018 (IT) ........................ 102018000005431

(51) Int. Cl.
*A61G 13/12* (2006.01)
*A61G 13/00* (2006.01)

(52) U.S. Cl.
CPC ..... *A61G 13/1245* (2013.01); *A61G 13/0081* (2016.11); *A61G 2203/10* (2013.01); *A61G 2203/32* (2013.01); *A61G 2203/42* (2013.01)

(58) Field of Classification Search
CPC ............ A61G 13/1245; A61G 13/0081; A61G 2203/10; A61G 2203/32; A61G 2203/42; A61G 2203/20; A61G 13/125
See application file for complete search history.

(56) References Cited

U.S. PATENT DOCUMENTS 2,216,764 A 10/1940 Clark
4,186,920 A 2/1980 Fiore et al.
(Continued)

FOREIGN PATENT DOCUMENTS

CN 102387769 A 3/2012
CN 103027823 A 4/2013
(Continued)

OTHER PUBLICATIONS

Notice of Reasons for Refusal received in connection with Japanese Application No. 2020-564188, dated Dec. 3, 2021, 15 pages (English translation included).
(Continued)

*Primary Examiner* — Justin C Mikowski
*Assistant Examiner* — Alison N Labarge
(74) *Attorney, Agent, or Firm* — Meunier Carlin & Curfman LLC

(57) ABSTRACT

A patient limb positioning apparatus comprises a movement assembly operating on a coupling bracket which can be engaged with the patient's limb, to move the limb according to a plurality of axes of movement. The movement assembly comprises, for at least one of said axes of movement, a drive unit which can be activated to move the coupling bracket according to a predetermined direction of movement. A load
(Continued)

transducer detects a load transmitted between the coupling bracket and the drive unit in the respective direction of movement, to emit a signal representative of a detected load value. An electronic control unit is selectively switchable to a load control command mode and is suitable to cyclically compare the measured load value with a pre-set load value, to control activation of the drive unit when the detected load value differs from the pre-set load value.

21 Claims, 7 Drawing Sheets

(56) References Cited

U.S. PATENT DOCUMENTS

| | | | | |
|---|---|---|---|---|
| 5,170,776 | A | 12/1992 | Pecheux | |
| 5,352,185 | A | 10/1994 | Blauth et al. | |
| 5,474,520 | A | 12/1995 | Bittikofer | |
| 6,277,057 | B1 | 8/2001 | Hayden | |
| 10,016,900 | B1 * | 7/2018 | Meyer | B25J 9/0084 |
| 2007/0055193 | A1 * | 3/2007 | Daury | A61G 13/0072 602/33 |
| 2014/0348572 | A1 | 11/2014 | Matsuzawa et al. | |
| 2015/0216749 | A1 | 8/2015 | Heil et al. | |
| 2015/0231013 | A1 * | 8/2015 | Bernardoni | A61G 13/123 128/845 |
| 2016/0346147 | A1 * | 12/2016 | Brown | A61G 13/1245 |
| 2016/0374768 | A1 * | 12/2016 | Griffiths | B25J 9/1633 606/130 |
| 2019/0015285 | A1 | 1/2019 | Dickie et al. | |

FOREIGN PATENT DOCUMENTS

| | | | | | |
|---|---|---|---|---|---|
| CN | 203520744 | U | | 4/2014 | |
| CN | 104760054 | A | | 7/2015 | |
| EP | 1626320 | A1 | | 2/2006 | |
| JP | 10211243 | A | | 8/1998 | |
| JP | 2000-501310 | A | | 2/2000 | |
| JP | 2004348699 | A | * | 12/2004 | A61F 5/04 |
| JP | 2007535378 | A | | 12/2007 | |
| JP | 2015528367 | A | | 9/2015 | |
| JP | 2016-30049 | A | | 3/2016 | |
| JP | 2017-038842 | A | | 2/2017 | |
| KR | 101744147 | B1 | | 6/2017 | |
| WO | 9720534 | A | | 6/1997 | |
| WO | 2005107674 | A2 | | 11/2005 | |
| WO | 2010092497 | A1 | | 8/2010 | |
| WO | 2014045199 | A1 | | 3/2014 | |

OTHER PUBLICATIONS

International Search Report and Written Opinion for International Application No. PCT/IB2019/053363 dated Jun. 27, 2019.

* cited by examiner

POSITIONING APPARATUS OF A PATIENT'S LIMB

TECHNICAL FIELD

The present invention applies to the field of orthopaedic surgery and refers in particular to an apparatus for positioning a patient's limb, in particular a lower limb, during an operation. The apparatus is especially useful in hip replacement operations with anterior approach.

KNOWN ART

The known art proposes different surgical techniques for the partial or total replacement of a patient's hip prosthesis.

A recently introduced technique, particularly appreciated because of its low invasiveness, involves an anterior approach which reaches the hip joint by passing through the intermuscular plane between the tensor of the fascia lata and the sartorius/rectus femoris. This technique is usually identified by the acronym AMIS®.

To perform this technique correctly, it is however necessary to perform a series of manipulations of the lower limb of the patient so that the surgeon is always able to operate in conditions of optimal access to the surgical site. In this case, the limb of the patient, lying in the supine position, must first be placed in light traction to facilitate an initial capsulotomy procedure. The traction should then be slightly increased before the subsequent femoral neck osteotomy procedure. Once the osteotomy has been performed, further traction is applied and subsequent external rotation of the joint is executed to allow extraction of the head of the resected femur. Traction on the limb is then released before the acetabulum is reamed and the replacement cup is positioned.

To prepare for introduction of the femoral prosthesis, traction is re-applied, then an external rotation of more than 90° is performed, traction is released, the limb is hyperextended and it is adducted. The limb is then returned to its original position before suturing.

As clearly evident from the brief description of the surgical technique provided above, the number and precision of the manipulations to be performed make it necessary to use an auxiliary apparatus for positioning the lower limb.

Although they essentially meet the sector's needs, currently known positioning devices nevertheless have some unresolved drawbacks.

First, it is noted that many known devices must be operated by a dedicated operator. In addition to the surgeon and the surgical technician, the presence of an additional person in the operating room is necessary, with a consequent increase in the costs of the operation. In addition, the need to delegate the lower limb positioning procedures to a third-party operator may cause unease for the surgeon, forced to coordinate their operation with the interventions of another person.

To address these problems, WO 2014/045199, on behalf of the same Applicant, proposes an apparatus in which the axes of traction and extension are controlled by actuators, preferably of pneumatic type. By using a control pedal, the surgeon can appropriately operate the actuators to bring about movement of the limb in traction and extension, during the various stages of the operation.

However, in the current state of the art, moving the limb in extension while simultaneously holding it in traction may uncontrollably increase the amount of traction on the limb, causing overdistensions of or lacerations to the muscles or ligaments. In order to avoid overdistensions in conjunction with activation of the extension drive unit, the apparatus is therefore equipped with means of release of the traction carriage, configured to unlock this carriage automatically during translation of the extension carriage. In this way, each time leg extension or flexion is performed (lowering or raising of the leg) by means of the extension drive unit, the traction slider is thus unlocked, allowing automatic release of the traction. This prevents the soft tissues of the leg from being further subjected to traction, avoiding possible nerve and/or muscle lesions and, in any event, permanent or semi-permanent post-operative pain to the patient.

The Applicant has however observed that a complete release of traction during extension movements is not always desirable. On the contrary, it has been observed that total release of traction during the extension movement may, for example, cause sudden movements of the traction slider which may make the leg jerk and consequently cause the retractors in the wound to lose their stability. These sudden and uncontrolled movements can cause small muscle lesions and require the surgeon to reposition the retractors.

The Applicant has therefore realised that in many circumstances it is appropriate for the extension movement to be carried out in the presence of adequate and constant traction on the limb.

Similar situations may occur in relation to maintaining torsional stress on the limb during extension movements and/or traction movements, and vice versa.

In addition, known devices still require the intervention of a dedicated operator to apply the appropriate rotational movements to the patient's limb while the surgeon operates on the head of the femur or other parts of the leg.

The Applicant has also observed that during execution of the operation the surgeon may need to make small adjustments to the limb's position and to the loads applied to the limb, to bring it into the most suitable conditions for the execution of certain treatments. Management of such small adjustments by servo-controlled actuators may not be intuitive, and the required accuracy is difficult to achieve.

The applicant has therefore realised that it would be beneficial to give the surgeon the opportunity to make small adjustments to the position of the limb during execution of the operation by also acting directly with their own hands on the patient's limb.

The technical problem behind this invention is, therefore, to offer a positioning apparatus which resolves the described problems in the known art.

In particular, the aim is to offer more accurate control of the stresses applied to the patient's limb during manipulation of the limb in order to carry out the different stages of the surgical operation.

SUMMARY OF THE INVENTION

The said technical problem is resolved by a patient limb positioning apparatus comprising a coupling bracket detachably engageable with the patient's limb, and a movement assembly operating on the coupling bracket to move it according to a plurality of axes of movement. The movement assembly comprises, for at least one of said axes of movement, a drive unit which can be activated to move the coupling bracket according to a predetermined direction of movement.

Preferably, a load transducer is provided, configured to detect a load transmitted between the coupling bracket and the drive unit in the respective direction of movement, and to emit a signal representative of a detected load value.

An electronic control unit is operationally connected with said drive unit and with the load transducer.

Preferably, in a load control command mode, the electronic control unit is configured to compare the detected load value with a pre-set load value, and to command activation of the drive unit when the detected load value differs from the pre-set load value.

This makes it much easier to manipulate the patient's limb during the various stages of the operation. In particular, manipulation can be controlled directly by the surgeon themself or by means of a pre-set program in the electronic control unit, without requiring the assistance of other qualified personnel to manage the movements according to the surgeon's instructions. The cooperation of the electronic control unit with the load transducer also facilitates precise and reliable control of the stresses imposed on the patient's limb, reducing the risk of causing unwanted lesions during the operation.

In at least one example of a preferred embodiment, one or more of the following characteristics may be provided.

Preferably, in the load control command mode the electronic control unit is configured to cyclically compare the signal emitted by the load transducer with the pre-set load value.

Preferably, in the load control command mode the electronic control unit is configured to reduce the difference between the detected load value and the pre-set load value.

More particularly, in the load control command mode the electronic control unit is preferably configured to command activation of the drive unit so as to move the coupling bracket in the direction of movement, in a way suitable to reduce the difference between the detected load value and the pre-set load value.

In other words, when the limb is induced to move along the direction of movement assigned to the drive unit, for example as a result of manual intervention by the surgeon directly on the limb or as a result of the drive exerted on another drive unit, the system is able to "track" the movement applied to the limb in the respective direction of movement so as to avoid overstressing the limb.

Preferably, the electronic control unit is switchable to a load setting operating mode in which it is configured to store the pre-set load value.

Preferably, the electronic control unit is switchable to a load setting operating mode in conjunction with a command disabling the position control command mode.

It is therefore possible to enable adaptive management of the drive unit by the electronic control unit.

Preferably, the pre-set load value corresponds to the load value measured by the load transducer while the drive unit holds the coupling bracket in a stationary position in the direction of movement.

This technical solution makes it possible to improve adaptive management of the drive unit. In fact, it is easy to change the pre-set load value, based on the new position assumed by the patient's limb at the end of the manual movement effected by the surgeon.

Preferably, the apparatus is further provided with a communication interface operationally associated with the electronic control unit for the entering of the pre-set load value by an operator.

Preferably, the pre-set load value can be chosen from a database of a plurality of preselected load values.

More particularly, in the load setting operating mode the electronic control unit is configured to store the load value measured by the load transducer while the drive unit holds the coupling bracket in a stationary position in the direction of movement.

Preferably, said drive unit also comprises a motor and a torque limiter operationally interposed between the motor and the coupling bracket Preferably, the load transducer is operationally interposed between the torque limiter and said coupling bracket.

This helps to increase reliability of readings from the load transducer. Any intervention of the torque limiter is in fact irrelevant with respect to the load reading from the load transducer.

Preferably, the movement assembly further comprises, for at least one of said axes of movement, a position transducer operationally connected to the electronic control unit and configured to measure the position of the coupling bracket with respect to the drive unit in the respective direction of movement, and to emit a signal representative of a detected position.

Preferably, the electronic control unit is switchable to a position control command mode in which it is configured to store a pre-set position of the coupling bracket with respect to the drive unit in the respective direction of movement, and to control activation of the drive unit when the detected position differs from the pre-set position.

Position control command is beneficially usable in addition to or as an alternative to load control command, to achieve servo-assisted control of the patient's limb position.

Preferably, in the position control command mode the electronic control unit is configured to cyclically compare the position of the coupling bracket with respect to the drive unit in the respective direction of movement.

Preferably, in the position control command mode the electronic control unit is configured to reduce the difference between the detected position and the pre-set position.

More particularly, in the position control command mode the electronic control unit is preferably configured to command activation of the drive unit so as to move the coupling bracket in the direction of movement, in a way suitable to reduce the difference between the detected position and the pre-set position.

Preferably, the electronic control unit is switchable to a position setting operating mode in which it is configured to store the pre-set position.

Preferably, the apparatus is further provided with a communication interface operationally associated with the electronic control unit for the entering of the pre-set position by an operator.

Preferably, the pre-set position is selectable from a library containing a plurality of preselected positions.

Preferably, in the position setting operating mode the electronic control unit is configured to store the position measured by the position transducer while the drive unit holds the coupling bracket in a stationary position in the direction of movement.

Preferably, the position transducer comprises an encoder which is operationally coupled to a drive unit motor.

Preferably, the movement assembly comprises:

- a traction arm having a proximal end which can be attached to an operating table;
- a traction slider movable along the traction arm upon command by a traction drive unit;
- a rotation drive unit borne by the traction slider, and operating on said coupling bracket to rotate it around an axis substantially coplanar to the traction arm;
- a guide column rising from a base;

an extension slider attached to a distal end of the traction arm and movable along the guide column upon command of an extension drive unit.

Preferably, the load transducer comprises a torsional load cell operationally associated with the rotation drive unit.

Preferably, the load transducer comprises an axial load cell operationally associated with the traction drive unit.

Preferably, the electronic control unit is configured to operate in load control command mode at least on the traction axis and/or rotation axis, during movement of the extension slider upon action of the extension drive unit.

Preferably, activation of the extension drive unit commands switching of the electronic control unit to load control command mode at least on the traction axis and/or rotation axis.

Preferably, the electronic control unit is configured to operate in load control command mode on at least the traction axis and/or rotation axis, during an adduction movement wherein the base and the guide column translate concentrically to the proximal end of the traction arm.

In this way, adaptive management of the traction drive unit is possible, so as to prevent the patient's limb from being inadvertently subjected to abnormal stresses during extension movements and/or adduction movements.

Preferably, at least one position transducer is provided for each of said traction, rotation and extension drive units.

Preferably, at least one of these drive units comprises an electric motor.

Preferably, at least one of said drive units comprises a brake which can be selectively activated to prevent repositioning of the respective slider or the coupling bracket.

Preferably, said brake operates between the electric motor and the respective slider or coupling bracket.

Preferably, said brake operates between the electric motor and the load transducer. The load reading by the load transducer can therefore be performed more precisely under stationary conditions when the brake is applied.

Preferably, said brake is normally active and can be electrically deactivated in conjunction with activation of the respective electric motor, to enable sliding of the respective slider or rotation of the coupling bracket.

Further characteristics and benefits will be more apparent from the detailed description of a preferred, but not exclusive, embodiment of a patient limb positioning apparatus, according to the present invention.

BRIEF DESCRIPTION OF THE DRAWINGS

This description will be set out below with reference to the attached drawings, which are provided for information purposes only and are therefore non-limiting, wherein.

DETAILED DESCRIPTION

Figure 1:
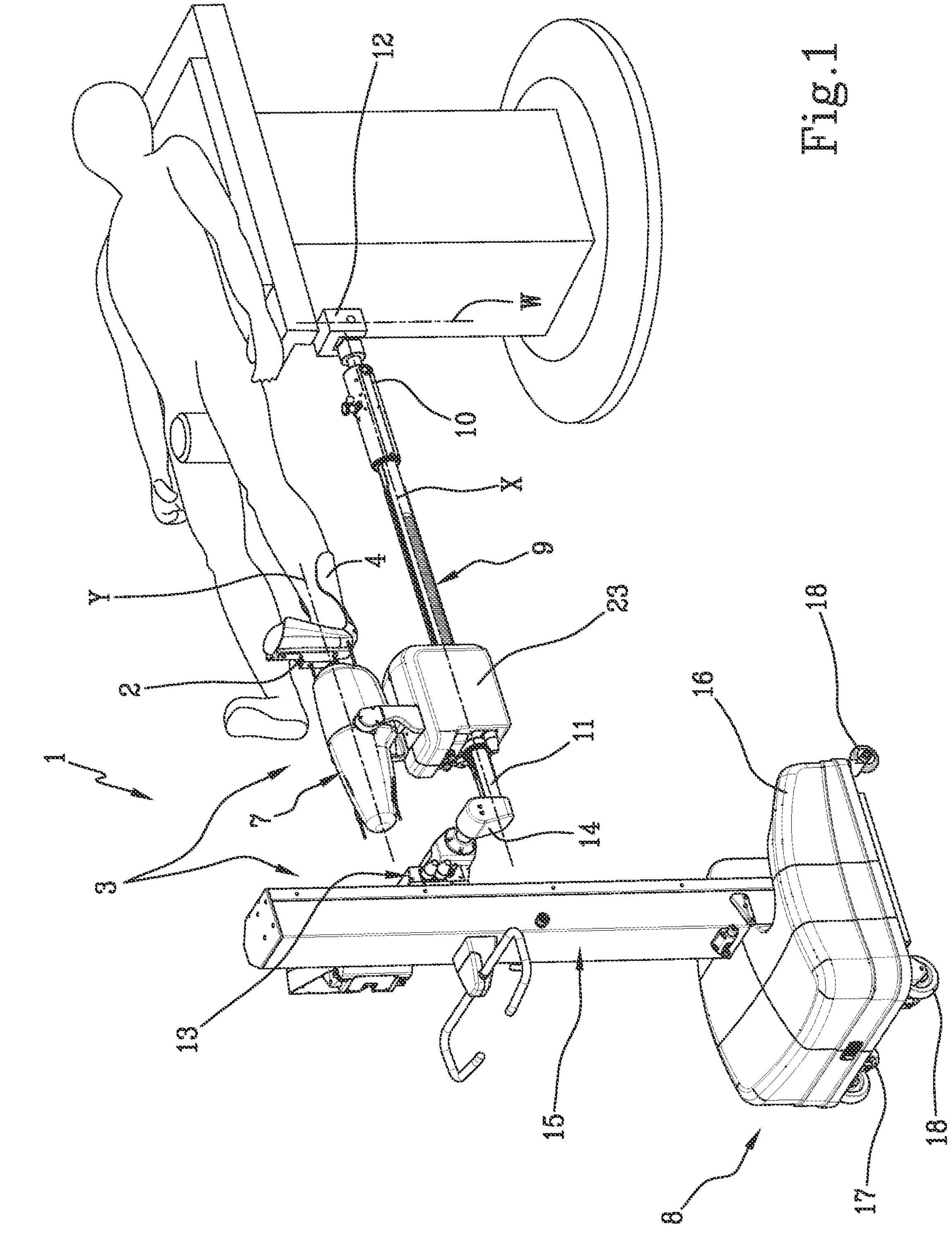
FIG. 1 shows in perspective view an apparatus according to the present invention, in the process of being used on a patient.
Figure 2:
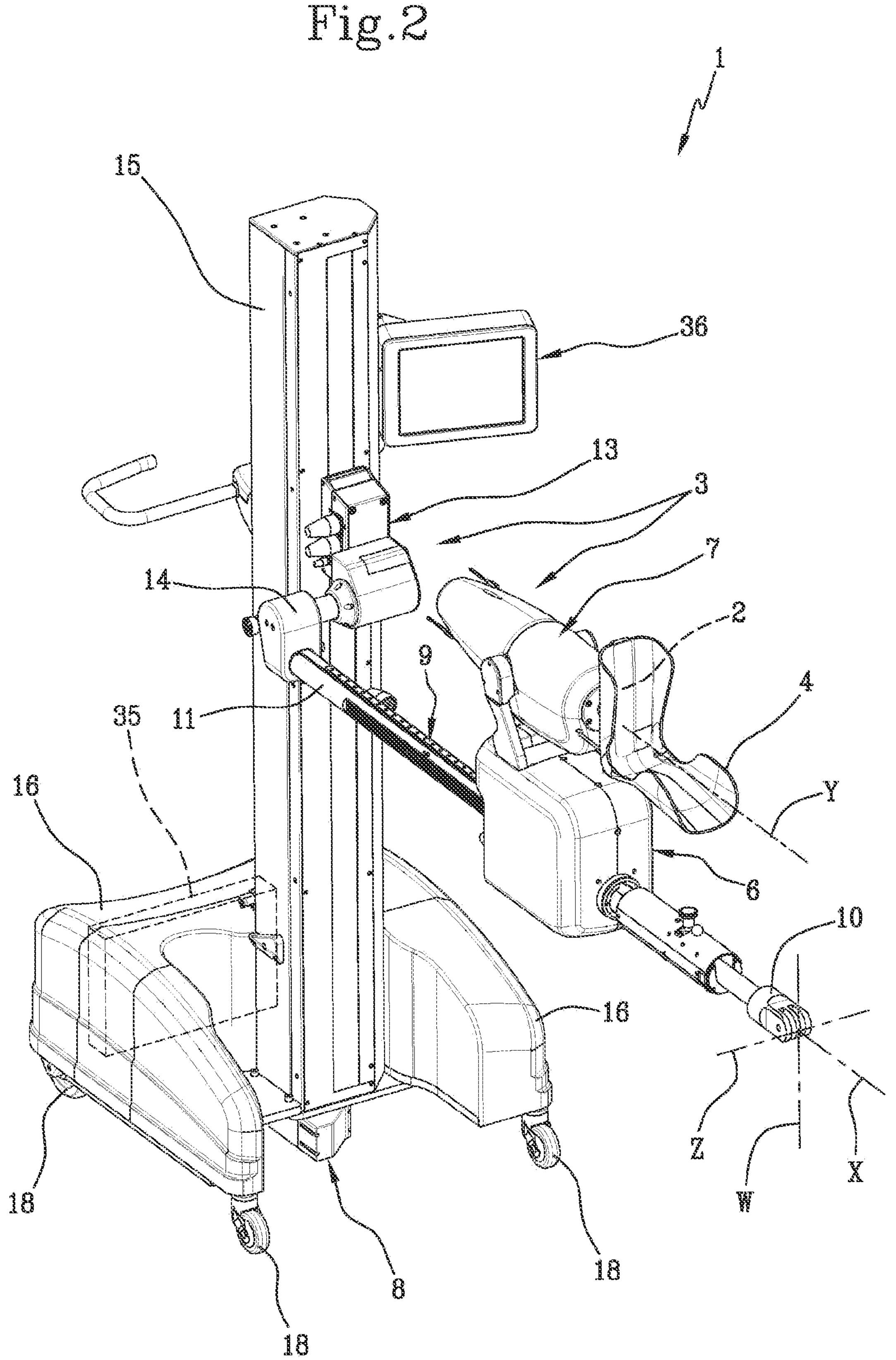
FIG. 2 shows the apparatus in perspective view from a different angle to that of FIG. 1.
Figure 3:
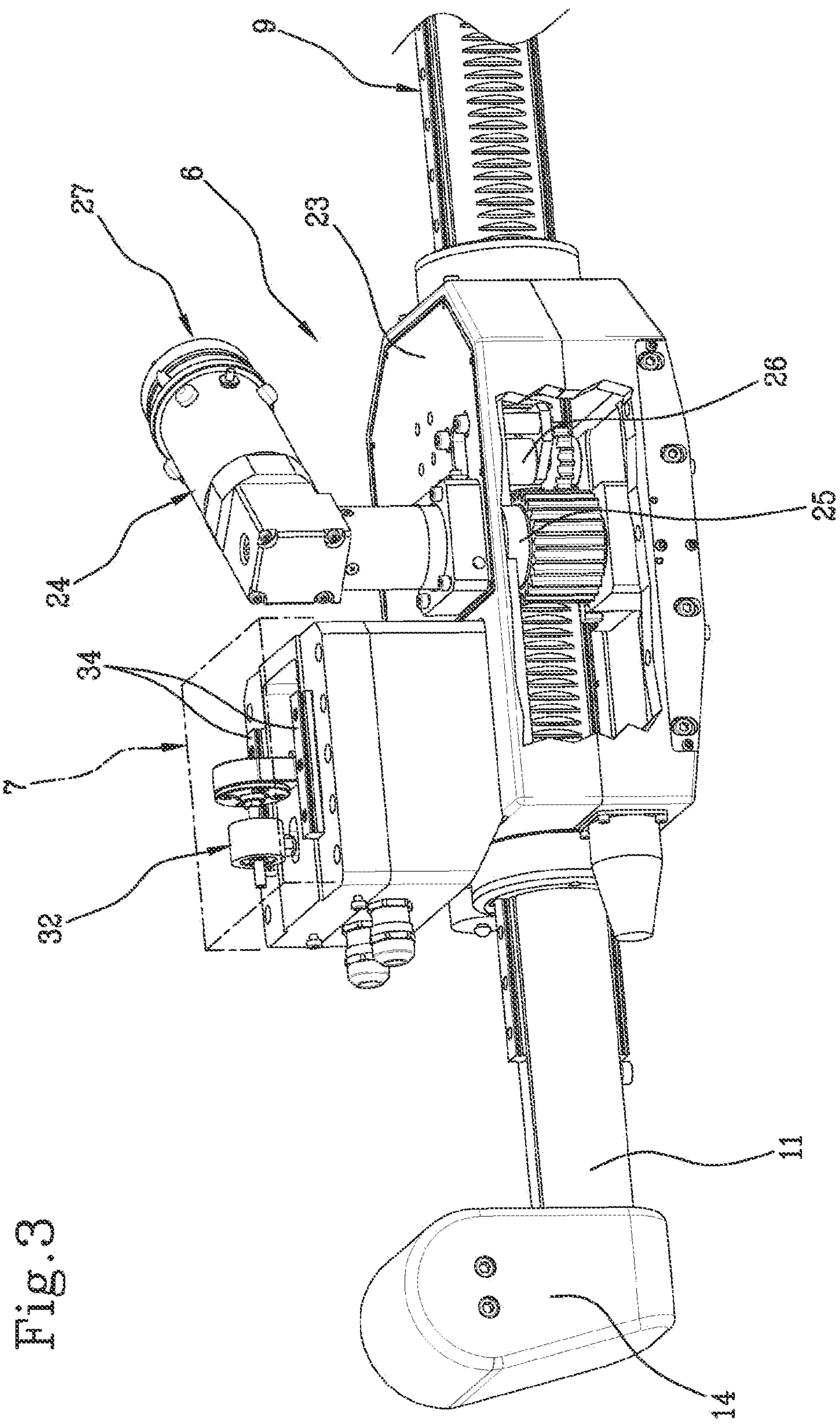
FIG. 3 shows the internal components of the traction drive unit.
Figure 4:
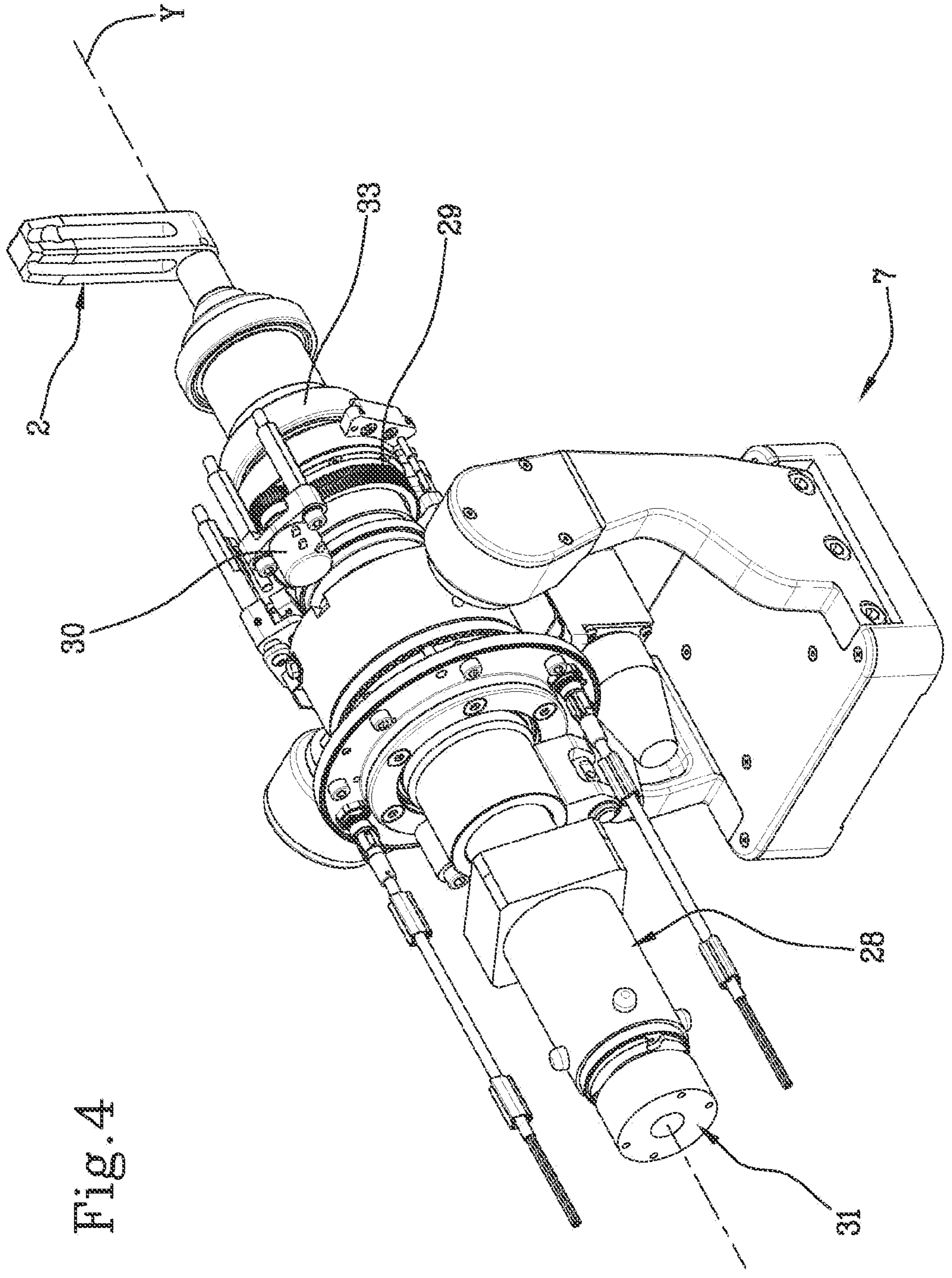
FIG. 4 shows the internal components of the rotation drive unit.
Figure 5:
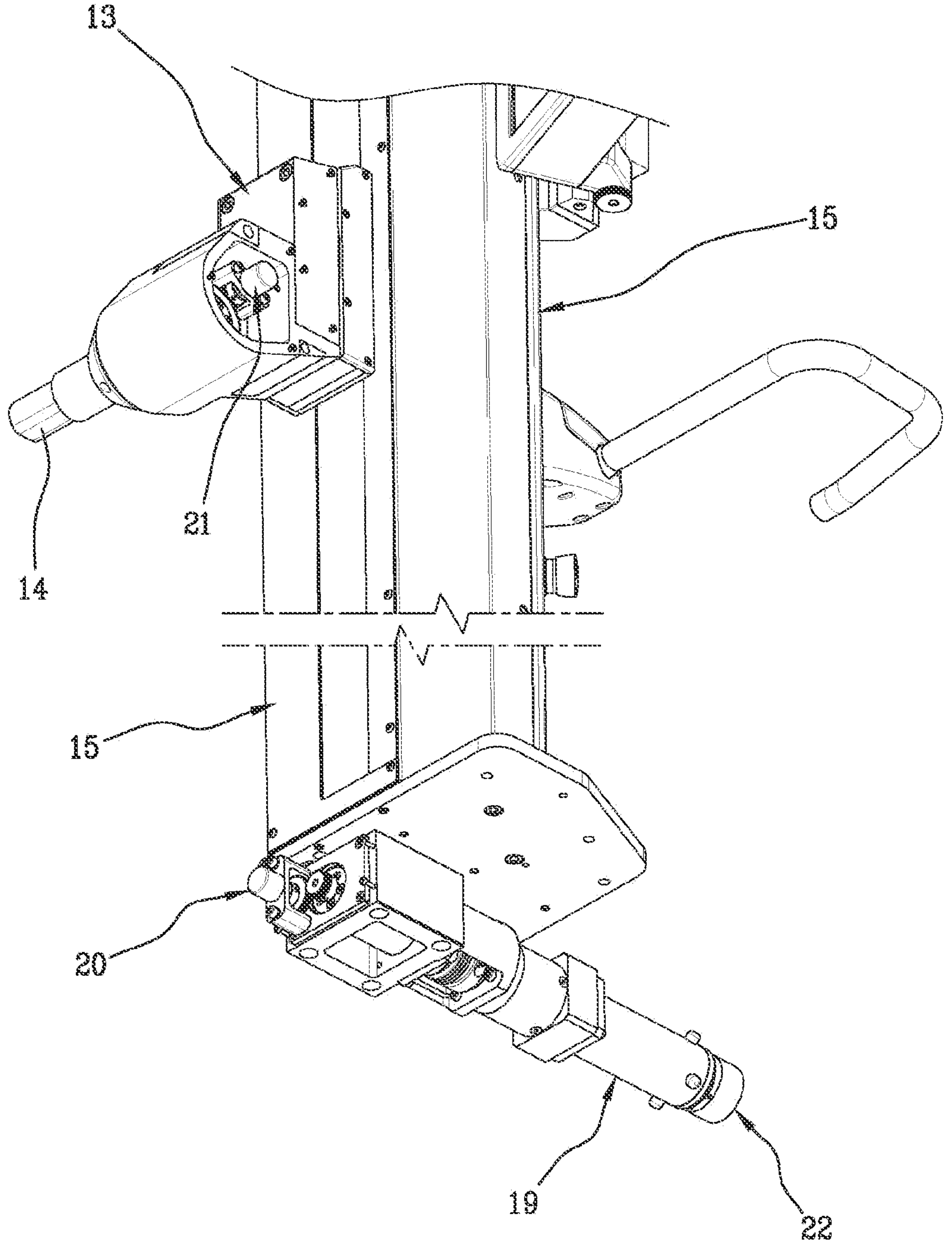
FIG. 5 shows the internal components of the extension drive unit.

In the above figures, the number 1 designates in its entirety a patient limb positioning apparatus, according to the present invention.

In the example shown, the apparatus 1 is suitable for use during performance of surgical procedures with anterior approach for the partial or total replacement of the hip prosthesis of a patient, in order to position, move and/or adequately stress the patient's leg during surgery.

The apparatus 1 essentially comprises a coupling bracket 2, detachably engageable with the patient's limb, and a movement assembly 3, operating on the coupling bracket 2 to move it according to a plurality of axes of movement X, Y, Z, W.

The coupling bracket 2 can be combined with a shoe 4 suitable to fit on the foot of the patient, lying in the supine position on an operating table 5.

In the example shown, axes of movement are identified including the axes X, Y, Z, W:

- a traction axis X, typically horizontal, substantially parallel to the patient's limb engaged in the shoe 4;
- a rotation axis Y, substantially coincident with a longitudinal axis of the limb; an extension axis Z, preferably horizontal, substantially perpendicular to the traction axis X; and
- an adduction axis W, preferably vertical, substantially orthogonal with respect to the extension axis Z.

During the surgical operation, the adduction axis W and the extension axis Z are positioned near the proximal end of the limb engaged in the shoe 4.

For one or more of the axes of traction X, rotation Y, extension Z, and adduction W, a corresponding drive unit 6, 7, 8 is provided, which can be activated to move the coupling bracket 2 according to a predetermined direction of movement along or around the respective axis. More specifically, in a preferred embodiment a traction drive unit 6, a rotation drive unit 7 and an extension drive unit 8 are provided.

When the traction drive unit 6 is activated, the coupling bracket 2 is moved in a straight line parallel to the traction axis X. Activation of the rotation drive unit 7 or the extension drive unit 8 results in angular movement of the coupling bracket 2 around the respective axes of rotation Y or extension Z.

Adduction movements can be controlled manually by the surgeon or other operator, to move the coupling bracket 2 angularly around the adduction axis W.

The movement assembly 3 comprises a traction arm 9, extending parallel to the traction axis X and having a proximal end 10 and a distal end 11. The proximal end 10 can be detachably attached to a proximal coupling 12, supported below by the operating table 5. Preferably, the proximal coupling 12, as is known, gives the traction arm 9 freedom of movement with respect to the operating table 5, around at least a first and a second axis of movement orthogonal to each other, for example respectively horizontal and vertical, respectively coincident with the extension axis Z and the adduction axis W.

The distal end 11 of the traction arm 9 is in turn attached to an extension slider 13, preferably by means of a distal coupling 14 which also offers it the possibility of movement around a first and a second axis, for example respectively horizontal and vertical. The extension slider 13 can slide along a guide column 15, preferably vertical. Translations of the extension slider 13 along the guide column 15 correspond to movements of the coupling bracket 2 around the extension axis Z.

Preferably, the guide column 15 rises from a support base 16. The base 16, resting on the floor of the operating theatre, is preferably equipped with retractable wheels 17 which can rotate along axes substantially parallel to the traction arm 9 and can be moved simultaneously on command of one or more actuators (not shown in the drawings) between a resting position and a working position. In the resting position, the retractable wheels 17 remain raised from the floor, and the base 16 acts against the floor by means of auxiliary support elements 18, for example positioning wheels which can be rotated according to axes perpendicular to the traction arm 9: in this condition, it is possible to position the retractable wheels closer to and further away from the operating table 5, parallel to the traction arm 9, to facilitate connection with the proximal coupling 12. In the working position, the retractable wheels 17 protrude lower with respect to the auxiliary support elements 18: the base 16 is thus resting on the floor via the retractable wheels 17 which allow it to slide along a curved trajectory around the proximal coupling 12, according to the adduction axis W. This enables adduction movement of the patient's leg.

The extension slider 13 can move along the guide column 15 upon command of the extension drive unit 8. Movements of the extension slider 13 along the guide column 15 correspond to extension (upward) movements or flexion (downward) movements of the patient's leg.

The extension drive unit 8 preferably comprises an extension motor 19, preferably electrically driven, which may be equipped with a respective speed reducer. Motion can be transmitted to the extension slider 13, for example, by means of a toothed belt. At least one extension position transducer 20, preferably an encoder of the absolute type, is operationally coupled to the extension drive unit 8. The extension position transducer 20 can, for example, be engaged with the extension motor 19, or coupled to the extension drive unit 8 in another way suitable for detecting the position of the extension slider 13 along the guide column 15, to emit a signal representative of the detected position. In addition or alternatively, an inclinometer sensor 21 may be provided, comprising for example an absolute encoder operating on the distal coupling 14 to detect the orientation of the traction arm 9.

The extension drive unit 8 may further comprise an extension brake 22, which can be selectively activated to prevent repositioning of the extension slider 13 along the guide column 15. The extension brake 22 can operate on the extension motor 19 or another component of the drivetrain which connects the motor to the guide column 15. In one embodiment, the extension brake 22 may for example be attached to the stator of the extension motor 19, to brake the shaft bearing the respective rotor. The extension brake 22, normally active, can be deactivated electrically to enable sliding of the extension slider 13 in conjunction with activation of the extension motor 19.

The movement assembly 3 further comprises a traction slider 23 which can move along the traction arm 9 upon command of the traction drive unit 6.

The traction drive unit 6 comprises a traction motor 24, preferably electrically driven, which may be equipped with a respective speed reducer. A first torque limiter 25 can be operationally coupled to the traction drive unit 6, configured to mechanically release the coupling bracket 2 from the traction motor 24 when a predetermined torque limit is exceeded. The first torque limiter 25, comprising for example a friction clutch, can be operationally positioned between the traction motor 24 and the traction arm 9, or in any other location along the drivetrain connecting the motor to the coupling bracket 2. In addition to or as an alternative to the clutch, the first torque limiter 25 may comprise a mechanical clutch which can be activated to disconnect the traction motor 24 kinematically from the traction slider 23, and consequently from the coupling bracket 2, following intervention of the clutch or in any case when the predetermined torque limit is exceeded.

A traction position transducer 26, preferably an encoder of the absolute type, is operationally coupled to the traction drive unit 6. The traction position transducer 26 can, for example, be engaged with the traction motor 24, or coupled to the traction drive unit 6 in another way suitable for detecting the position of the traction slider 23 along the traction arm 9, to emit a signal representative of the detected position.

The traction position transducer 26 preferably operates downstream of the first torque limiter 25 with respect to the traction motor 24. In this way, possible intervention of the first torque limiter 25 does not affect the correct detection of the position of the traction slider 23.

The traction drive unit 6 may further comprise a traction brake 27, which can be selectively activated to prevent repositioning of the traction slider 23 along the traction arm 9. The traction brake 27 can operate on the traction motor 24 or another component of the drivetrain which connects the motor to the traction arm 9. In one embodiment, the traction brake 27 may for example be attached to the stator of the traction motor 24, to brake the shaft bearing the respective rotor. The traction brake 27, normally active, can be deactivated electrically in conjunction with activation of the traction motor 24, to enable sliding of the traction slider 23.

The rotation drive unit 7, operationally mounted on the traction slider 23, operates on the coupling bracket 2 to rotate it around the respective rotation axis Y substantially coplanar, and preferably parallel, to the traction arm 9. The rotation drive unit 7 preferably comprises a rotation motor 28, preferably electrically driven, which may be equipped with a respective speed reducer. A second torque limiter 29 can be operationally coupled to the rotation drive unit 7, configured to mechanically release the coupling bracket 2 from the rotation motor 28 when a predetermined torque limit is exceeded. The second torque limiter 29, comprising, for example, a friction clutch, can be operatively interposed between the rotation motor 28 and the coupling bracket 2. In addition to or as an alternative to the clutch, the second torque limiter 29 may comprise a mechanical clutch which can be activated to disconnect the rotation motor 28 kinematically from the coupling bracket 2, following intervention of the clutch or in any case when the predetermined torque limit is exceeded.

A rotation position transducer 30, preferably an encoder of the absolute type, is operationally coupled to the rotation drive unit 7. The rotation position transducer 30 can, for example, be engaged with the rotation motor 28, and/or the respective speed reducer, or coupled to the rotation drive unit 7 in another way suitable for detecting the angular position of the coupling bracket 2 around the respective rotation axis Y, to emit a signal representative of the detected position.

The rotation position transducer 30 preferably operates downstream of the second torque limiter 29 with respect to the rotation motor 28. In this way, possible intervention of the torque limiter does not affect correct detection of the angular position of the coupling bracket 2.

The rotation drive unit 7 may further comprise a rotation brake 31, which can be selectively activated to prevent repositioning of the coupling bracket 2 around the rotation axis Y. The rotation brake 31 can operate on the rotation motor 28 or another component of the drivetrain which connects the motor to the coupling bracket 2. In one embodiment, the rotation brake 31 may for example be attached to the stator of the rotation motor 28, to brake the shaft bearing the respective rotor. The rotation brake 31, normally active, can be deactivated electrically in conjunction with activation of the rotation motor 28, to enable angular rotation of the coupling bracket 2.

For at least one of the axes of movement X, Y, Z, W, it is further provided that the movement assembly 3 comprises a load transducer 32, 33 configured to detect a load transmitted between the coupling bracket 2 and the drive unit 6, 7, 8 in the respective direction of movement, and to emit a signal representative of a detected load value.

More specifically, a traction load transducer 32 and a rotation load transducer 33 may be provided, connected respectively to serve the traction drive unit 6 and the rotation drive unit 7.

The traction load transducer 32 may comprise an axial load cell, for example operationally interposed between the traction slider 23 and the rotation drive unit 7, so as to detect the load transmitted between the coupling bracket 2 and the traction slider itself, along the rotation axis Y. In this respect, it may be provided that the rotation drive unit 7 is engaged in the traction slider 23 with the possibility of movement parallel to the traction arm 9, for example by means of the slide guide 34, so that the traction load transducer 32 is adequately loaded. The traction brake 27 is operationally interposed between the traction motor 24 and the traction load transducer 32.

The rotation load transducer 33 may, for example, comprise a torsional load cell, operationally associated with the rotation drive unit 7 to detect the load transmitted around the rotation axis Y. For example, the torsional load cell may be operationally interposed between the rotation motor 28 and the coupling bracket 2. The rotation brake 31 is operationally interposed between the rotation motor 28 and the rotation load transducer 33.

In a preferred embodiment, it is provided that both the abovementioned traction load transducer 32 and the rotation load transducer 33 are used.

Activation of the drive units 6, 7, 8 is controlled by at least one electronic control unit 35, for example at least partially housed in the support base 16 and operationally interconnected with the motors 19, 24, 28, the position transducers 20, 26, 30 and the load transducers 32, 33. The electronic control unit 35 may consist of a single electronic device, suitably programmed to perform the functions described, and/or divided into separate functional modules corresponding to the respective hardware entities and/or software routines forming part of the programmed device. The control unit may also use one or more processors to execute instructions contained in one or more programs stored in a memory unit.

One or more of the drive units 6, 7, 8 may be controlled by the electronic control unit 35 according to a position control command mode. When it operates according to this command mode, the electronic control unit 35 is suitable to store a pre-set position of the coupling bracket 2 with respect to the drive unit 6, 7, 8 in the respective direction of movement, and to control activation of the drive unit 6, 7, 8 when the detected position differs from the pre-set position.

In addition or alternatively, for at least one of the axes of movement X, Y, Z, W, the electronic control unit 35 is suitable to operate in a load control command mode. When it operates according to this command mode, the electronic control unit 35 is suitable to compare the pre-set load value with the load value detected by the respective load transducer 32, 33, and to command activation of the respective drive unit 6, 7, 8 when the detected load value differs from the pre-set load value.

In a preferred embodiment, for at least one of the axes of movement X, Y, Z, W, preferably for at least the rotation axis Y and the traction axis X, the electronic control unit 35 is suitable to operate in both command modes. In this circumstance it is preferable that the position control command mode and the load control command mode are individually and alternatively selectable according to the requirements.

Movement around the extension axis Z can in turn only be controlled according to the position control command mode, performed on the positioning of the extension slider 13 along the guide column 15.

At least one communication interface 36, comprising for example a keypad, a touchscreen and/or a foot switch, operationally associated with the electronic control unit 35, allows the surgeon to interact with the apparatus. By means of a monitor or other optical or acoustic signalling devices, the communication interface 36 can also provide the surgeon or other operator with operational information, for example on the values of the loads and positions detected by the transducers, and/or on the operational status of the apparatus.

An example of an operational sequence for the apparatus 1 during execution of an operation is now described, from which further construction and functional characteristics can also be inferred.

As is known, the apparatus is first connected to the operating table 5 by connecting the proximal end 10 of the traction arm 9 to the proximal coupling 12. Suitable sensors (not shown) can be provided to inhibit any further action until correct coupling of the traction arm 9 to the operating table 5 is detected.

Once the coupling has been made, possibly on the surgeon's command via the communication interface 36, the electronic control unit 35 manages activation of the drive units 6, 7, 8 in order to set the coupling bracket 2 in a predetermined starting condition. In particular, the extension slider 13 is positioned along the guide column 15 until the traction arm 9 is arranged in a horizontal orientation, the traction slider 23 is positioned at an intermediate point of the development of the traction arm 9, and the coupling bracket 2 is positioned at an orientation of 0°, wherein the shoe 4 is oriented vertically to accommodate the patient's foot.

With the patient's foot appropriately attached to the shoe 4, the surgeon has the ability to control the movements and positions assumed by the leg suitably in the various stages of the surgical operation.

In particular, movements around the rotation axis Y and along the traction axis X axis can be controlled, as required, according to the position control command mode or load control command mode. In the example shown, movements around the extension axis Z are controlled only in the position control command mode.

Figure 6:
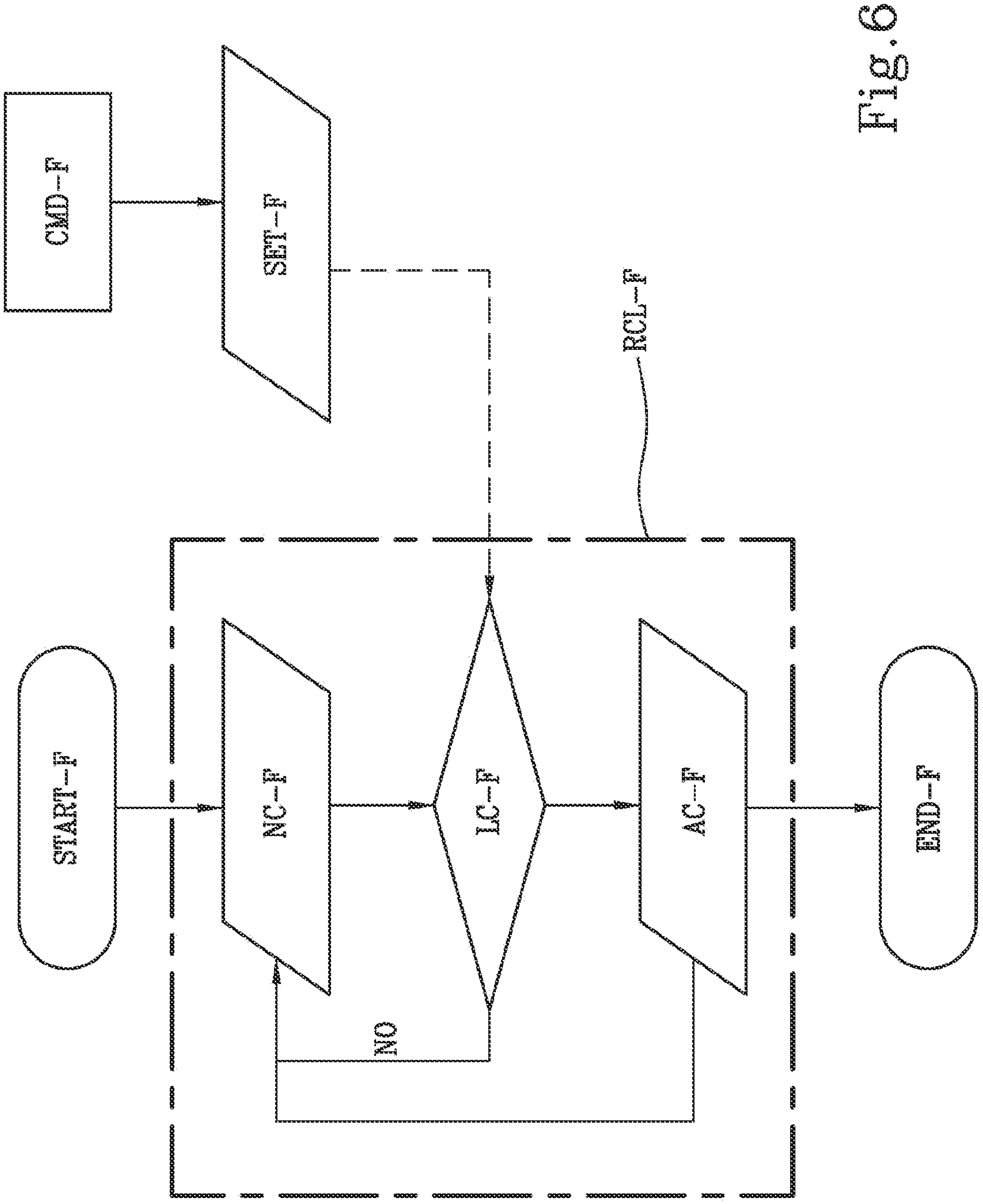
FIG. 6 is a logic flowchart for the operation of any one of the drive units in load control command mode.

With reference to the logic flowchart in FIG. 6, the load control command mode requires that the electronic control unit 35, for example following a START-F command, is initially switched to a load setting operating mode, wherein the pre-set load value SET-F can be stored. The pre-set load value SET-F can initially be entered directly by the operator using a CMD-F command via the communication interface 36, or selected from a database containing a plurality of preselected load values. The selection can be made directly by the operator using the CMD-F command, or automatically by the electronic control unit 35 based on other operational parameters.

After storage, activation of the respective traction drive unit 6 or rotation drive unit 7 is managed according to a feedback control logic RCL-F on the basis of which, for example by means of an LC-F logic comparison, the electronic control unit 35 repeatedly queries the respective load transducer 32, 33 and cyclically compares the signal emitted by the latter with the pre-set load value SET-F. If the comparison shows that the measured load value differs from the pre-set load value, the electronic control unit 35 generates an AC-F activation command for the respective traction drive unit 6 or rotation drive unit 7, in the correct direction to reduce the detected difference. More particularly, activation of the respective drive unit 6, 7 requires release of the brake 27, 31 and activation of the motor 24, 28, in order to move the coupling bracket 2 in the respective direction of movement, in a direction suitable for reducing the difference between the value of the measured load and the pre-set load value SET-F.

Activation of the drive unit 6, 7 is maintained until the comparison between the measured load value and the pre-set load value SET-F detects a substantial absence of difference. The electric motor 24, 28 is immediately stopped and the brake 27, 31 is reactivated to prevent repositioning of the traction slider 23 and/or the coupling bracket 2. If the load reading in stationary conditions still detects an unwanted difference from the pre-set value, a new AC-F activation command can be generated to obtain the required correction.

When the logic comparison LC-F detects that the measured load value coincides with the pre-set load value SET-F, a new value comparison cycle NC-F is further started without generating activation commands to the drive unit 6, 7.

The load control command mode described above can remain up until an exit command END-F.

Figure 7:
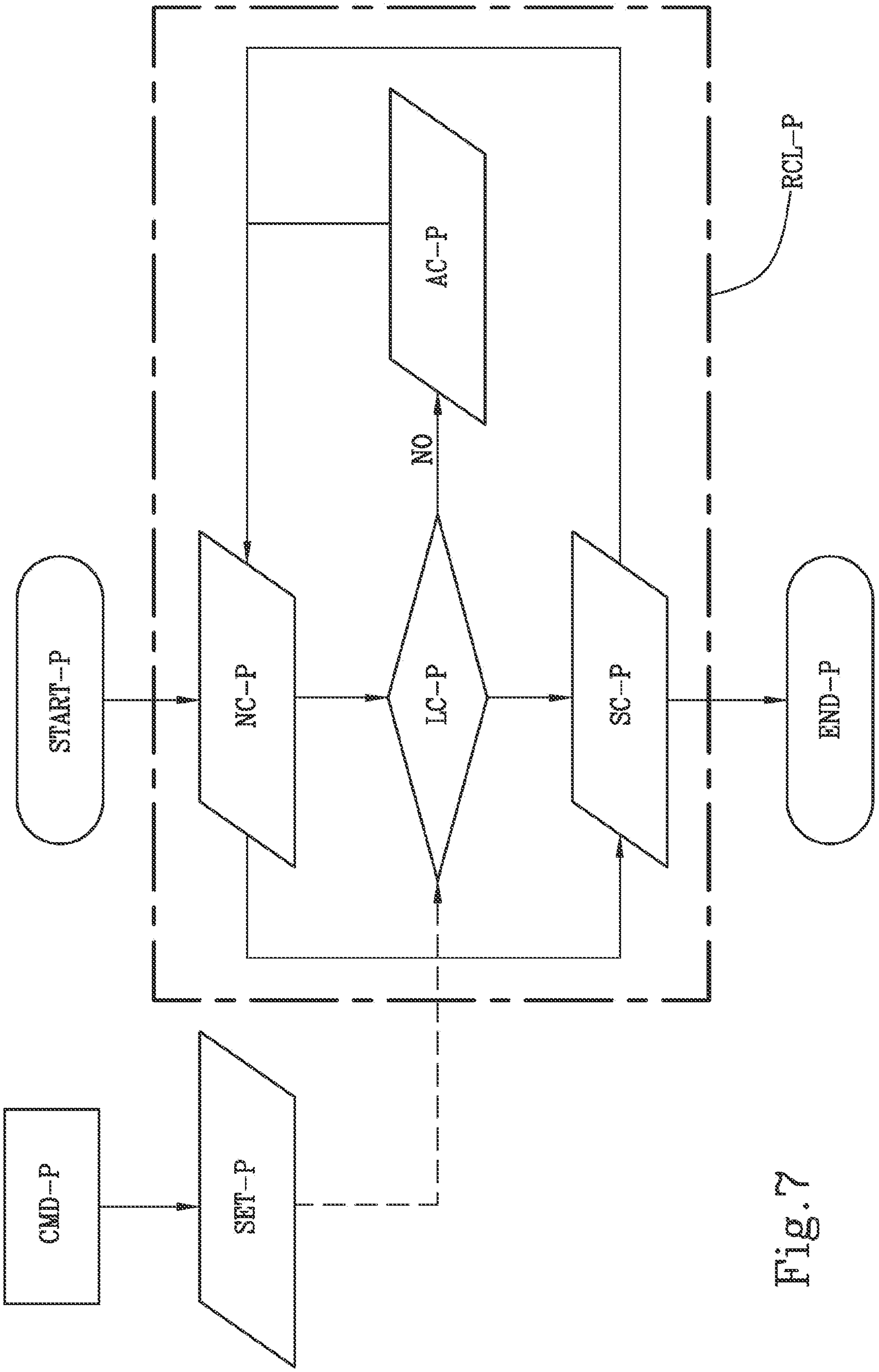
FIG. 7 is a logic flowchart for the operation of any one of the drive units in position control command mode.

With reference to the logic flowchart of FIG. 7, position control command mode in turn requires that the electronic control unit 35, for example following a START-P command, is initially switched to a position setting operating mode in which it is suitable to store a pre-established SET-P position of the coupling bracket 2, detected via the respective position transducer 20, 26, 30. The position of the coupling bracket 2 along the traction axis X is determined by the position of the respective traction slider 23 along the traction arm 9. Similarly, the position of the coupling bracket 2 around the extension axis Z can be determined by the position of the respective extension slider 13 along the guide column 15, or by the inclination of the traction arm 9 detected by the inclinometer sensor 21. The pre-set position SET-P can initially be entered directly by the operator using a CMD-P command via the communication interface 36, or selected from a database containing a plurality of preselected load values. The selection can be made directly by the operator using the CMD-P command, or automatically by the electronic control unit 35 based on other operational parameters.

After storage, activation of the respective traction drive unit 6, rotation drive unit 7 or extension drive unit 8 is managed according to a feedback control logic RCL-P on the basis of which, for example by means of an LC-P logic comparison, the electronic control unit 35 repeatedly queries the respective position transducer 20, 21, 26, 30 and cyclically compares the signal emitted by the latter with the pre-set position SET-P. If the comparison shows that the measured position differs from the pre-set position, the electronic control unit 35 generates an AC-P activation command for the respective traction drive unit 6, rotation drive unit 7 or extension drive unit 8, in the correct direction to reduce the detected difference, similarly to the above description with reference to load control command.

Activation of the drive unit 6, 7, 8 is maintained until the comparison between the measured position and the pre-set position SET-P detects a substantial absence of difference. By means of a stop command SC-P the electric motor 19, 24, 28 is immediately stopped and the brake 22, 27, 31 is reactivated to prevent repositioning of the extension slider 13, the traction slider 23, and/or the coupling bracket 2.

When the logic comparison LC-P detects that the measured position coincides with the pre-set position SET-P, a new value comparison cycle NC-P is further started without generating activation commands to the drive unit 6, 7, 8.

The load control command mode described above can remain until an exit command END-P.

Beneficially, switching to load control command mode also makes it possible to adaptively manage the traction drive unit 6 and/or the rotation drive unit 7. The adaptive management mode allows movement and/or positioning of the patient's limb in response to manual stresses imposed directly by the surgeon on the leg.

For the purposes of adaptive management, it may be provided that in conjunction with disabling position control command mode, immediately before or in conjunction with switching to load control command mode, the electronic control unit 35 is switched to load setting mode, to store the load value detected by the load transducer 32, 33 while the drive unit 6, 7 maintains the coupling bracket 2 according to a stationary position in the respective direction of movement. In other words, for one or both of the traction drive unit 6 and the rotation drive unit 7, the value of the load transmitted in the respective direction of movement under stationary conditions is stored in the position occupied by the system after the last stop in movement.

In this case, load control command is able to support actions carried out by the surgeon on the patient's leg. For example, if the surgeon manually acts on the leg by rotating it around the axis of rotation Y, the resulting change in load detected by the rotation load transducer 33 causes the rotation drive unit 7 to be activated, so that the coupling bracket 2 "follows" the movement effected by the surgeon. When the desired position is reached, the surgeon stops their manual action on the patient's leg and, via the communication interface 36, switches the electronic control unit 35 to position control command mode. The new position and load values can be stored and used as reference parameters for subsequent management of the movement assembly in position control command mode and/or load control command mode.

Beneficially, the electronic control unit 35 can also be configured to operate according to load control command mode, at least on the traction axis X and/or the rotation axis Y, during movement of the extension slider 13 upon activation of the extension drive unit 8, and/or during adduction movements manually effected on the apparatus.

To this end, load control command mode can be activated, automatically and/or on command of the operator via the communication interface 36, in conjunction with activation of the extension drive unit 8, and/or with actuation of the adduction movement.

Thanks to load control command, the traction drive unit 6 and/or the rotation drive unit 7 will be activated if necessary, so that the coupling bracket 2 can support the movements and the consequent stresses induced along the traction axis X and around the rotation axis Y. The loads imposed on the patient's limb during execution of the extension movements and/or adduction movements will therefore be kept substantially constant at the values previously stored, regardless of the dynamics imposed by movement of the extension slider 13 and/or the base 16.

At the end of the operation, the apparatus can be brought into a configuration suitable for disconnecting from the operating table 5 and for storage, for example by placing the extension slider at the lower point of the guide column 15, and the traction slider in a rearward position along the traction arm 9.

The invention claimed is:

1. A patient limb positioning apparatus comprising:

a coupling bracket detachably engageable with the patient's limb; and a movement assembly operating on the coupling bracket to move the coupling bracket according to a plurality of axes of movement;

wherein the movement assembly comprises, for at least one of said axes of movement:

a drive unit activatable to move the coupling bracket according to a predetermined direction of movement;

a load transducer configured to detect a load transmitted between the coupling bracket and the drive unit in the respective direction of movement, and to emit a signal representative of a detected load value;

a position transducer configured to measure the position of the coupling bracket with respect to the drive unit in the respective direction of movement, and to emit a signal representative of a detected position; and an electronic control unit operationally connected with said drive unit, said position transducer, and said load transducer;

wherein the electronic control unit is selectively switchable between a load control command mode and a position control command mode, wherein, in the load control command mode, the electronic control unit is configured to compare the detected load value with a pre-set load value and to command activation of the drive unit when the detected load value differs from the pre-set load value, and wherein, in the position control command mode, the electronic control unit is configured to store a pre-set position of the coupling bracket with respect to the drive unit in the respective direction of movement and to control activation of the drive unit when the detected position differs from the pre-set position.

2. The apparatus according to claim 1 wherein the electronic control unit is switchable to a load setting operating mode in which the electronic control unit is configured to store the pre-set load value.

3. The apparatus according to claim 2, wherein in the load setting operating mode the electronic control unit is configured to store the load value measured by the load transducer while the drive unit holds the coupling bracket in a stationary position in the direction of movement.

4. The apparatus according to claim 1, wherein the pre-set load value corresponds to the load value measured by the load transducer while the drive unit holds the coupling bracket in a stationary position in the direction of movement.

5. The apparatus according to claim 1, wherein said drive unit comprises a motor and a torque limiter operationally interposed between the motor and the coupling bracket.

6. The apparatus according to claim 5, wherein the load transducer is operationally interposed between the torque limiter and said coupling bracket.

7. The apparatus according to claim 1, wherein the electronic control unit is switchable to a position setting operating mode in which the electronic control unit is configured to store said pre-set position.

8. The apparatus according to claim 7, wherein in the position setting operating mode the electronic control unit is configured to store the position detected by the position transducer while the drive unit holds the coupling bracket in a stationary position in the direction of movement.

9. The apparatus according to claim 1, wherein the position transducer comprises an encoder operationally coupled to a motor of the drive unit.

10. The apparatus according to claim 1, wherein the drive unit comprises a traction drive unit, a rotation drive unit, and an extension drive unit, and the movement assembly comprises:

a traction arm having a proximal end constrainable to an operating table;

a traction slider movable along the traction arm upon command by the traction drive unit, wherein the rotation drive unit is borne by the traction slider and operates on said coupling bracket to rotate the coupling bracket around a rotation axis that is substantially coplanar to a traction axis of the traction arm;

a guide column rising from a base; and an extension slider constrained to a distal end of the traction arm and movable along the guide column upon command of the extension drive unit.

11. The apparatus according to claim 10, wherein the load transducer comprises a torsional load cell operationally associated with the rotation drive unit.

12. The apparatus according to claim 10, wherein the load transducer comprises an axial load cell operationally associated with the traction drive unit.

13. The apparatus according to claim 10, wherein the electronic control unit is configured to operate in load control command mode at least on the traction axis and/or rotation axis, during the movement of the extension slider upon activation of the extension drive unit.

14. The apparatus according to claim 10, wherein the electronic control unit is switchable to the load control command mode on at least the traction axis and/or rotation axis, in response to the activation of the extension drive unit.

15. The apparatus according to claim 10, wherein the electronic control unit is configured to operate in the load control command mode on at least the traction axis and/or rotation axis, during an adduction movement wherein the base and the guide column translate concentrically to the proximal end of the traction arm.

16. The apparatus according to claim 10, comprising at least one position transducer for each of said traction, rotation and extension drive units.

17. The apparatus according to claim 10, wherein at least one of said drive units comprises a brake selectively activatable to lock the position of the respective slider or the coupling bracket.

18. The apparatus according to claim 17, wherein at least one of said drive units comprises an electric motor, wherein said brake operates between the electric motor and the respective slider or coupling bracket.

19. The apparatus according to claim 17, wherein at least one of the said drive units comprises an electric motor, wherein said brake is normally active and is electrically deactivatable in conjunction with activation of the respective electric motor, to enable sliding of the respective slider or rotation of the coupling bracket.

20. The apparatus according to claim 17, wherein at least one of said drive units comprises an electric motor, wherein said brake operates between the electric motor and the load transducer.

21. A surgery method for a patient limb, comprising positioning the patient limb by the apparatus as claimed in claim 1.

* * * * *